US012580684B2

(12) United States Patent
Li

(10) Patent No.: US 12,580,684 B2
(45) Date of Patent: Mar. 17, 2026

(54) RETRANSMISSION REQUEST METHOD AND APPARATUS, AND RETRANSMITTED DATA RECEPTION METHOD AND APPARATUS

(71) Applicant: BEIJING XIAOMI MOBILE SOFTWARE CO., LTD., Beijing (CN)

(72) Inventor: Yuanyuan Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 438 days.

(21) Appl. No.: 18/014,123

(22) PCT Filed: Jul. 16, 2020

(86) PCT No.: PCT/CN2020/102498
§ 371 (c)(1),
(2) Date: Dec. 30, 2022

(87) PCT Pub. No.: WO2022/011655
PCT Pub. Date: Jan. 20, 2022

(65) Prior Publication Data
US 2023/0261790 A1 Aug. 17, 2023

(51) Int. Cl.
*H04L 1/08* (2006.01)
*H04B 17/318* (2015.01)
*H04J 11/00* (2006.01)

(52) U.S. Cl.
CPC .............. *H04L 1/08* (2013.01); *H04B 17/318* (2015.01); *H04J 11/00* (2013.01); *H04J 2011/0096* (2013.01)

(58) Field of Classification Search
CPC ....... H04L 1/08; H04L 1/1835; H04L 1/1896; H04L 1/1825; H04B 17/318; H04J 11/00; H04J 2011/0096
See application file for complete search history.

(56) References Cited

U.S. PATENT DOCUMENTS

| | | | | |
|---|---|---|---|---|
| 2009/0313518 A1* | 12/2009 | Shen | ...................... | H04L 1/1812 |
| | | | | 714/748 |
| 2013/0064312 A1* | 3/2013 | Huang | .................... | H04L 1/205 |
| | | | | 375/259 |
| 2017/0150502 A1* | 5/2017 | Chirala | ............. | H04W 36/0069 |
| 2020/0186293 A1* | 6/2020 | You | ...................... | H04L 1/1812 |

(Continued)

FOREIGN PATENT DOCUMENTS

| | | |
|---|---|---|
| CN | 110572236 A | 12/2019 |
| CN | 111092699 A | 5/2020 |

(Continued)

OTHER PUBLICATIONS

International Search Report of PCT/CN2020/102498 dated Apr. 15, 2021, (4p).

(Continued)

*Primary Examiner* — Abdullahi Ahmed
(74) *Attorney, Agent, or Firm* — Arch & Lake LLP

(57) ABSTRACT
A method for requesting retransmission performed by a network device located in air in a non-terrestrial network is provided. The method includes determining whether there is an error in data received from a transmitting end; determining there is an error in the data; and sending a request for retransmitting the data to the transmitting end.

12 Claims, 7 Drawing Sheets determine whether there is an error in data received from a transmitting end — S101 send a request for retransmitting the data to the transmitting end in response to determining that there is an error in the data — S102

(56)　　　References Cited

U.S. PATENT DOCUMENTS

| | | | | |
|---|---|---|---|---|
| 2020/0228194 | A1* | 7/2020 | Hassan Hussein | ... H04L 1/1822 |
| 2022/0078805 | A1* | 3/2022 | Yoshioka | .............. H04L 1/1825 |
| 2022/0200741 | A1* | 6/2022 | You | ...................... H04L 1/1812 |
| 2022/0361200 | A1* | 11/2022 | Yoshioka | .............. H04L 5/0048 |
| 2023/0379898 | A1* | 11/2023 | Kumagai | .................. H04L 1/08 |
| 2024/0056164 | A1* | 2/2024 | Matsuda | .............. H04L 1/1685 |

FOREIGN PATENT DOCUMENTS

| | | | |
|---|---|---|---|
| WO | 2009020336 A1 | 2/2009 | |
| WO | 2020087477 A1 | 5/2020 | |

OTHER PUBLICATIONS

Huawei, "Discussion on HARQ for NTN", 3GPP TSG RAN WG1 Meeting #97, R1-1905995, Reno, NV, May 13-17, 2019, (4p).

Huawei, "Discussion on HARQ for NTN", 3GPP TSG RAN WG1 Meeting #99, R1-1911861, Reno, NV, Nov. 18-22, 2019, (4p).

OA for IN application 202347002271 dispatched on Jul. 13, 2023, (6p).

* cited by examiner

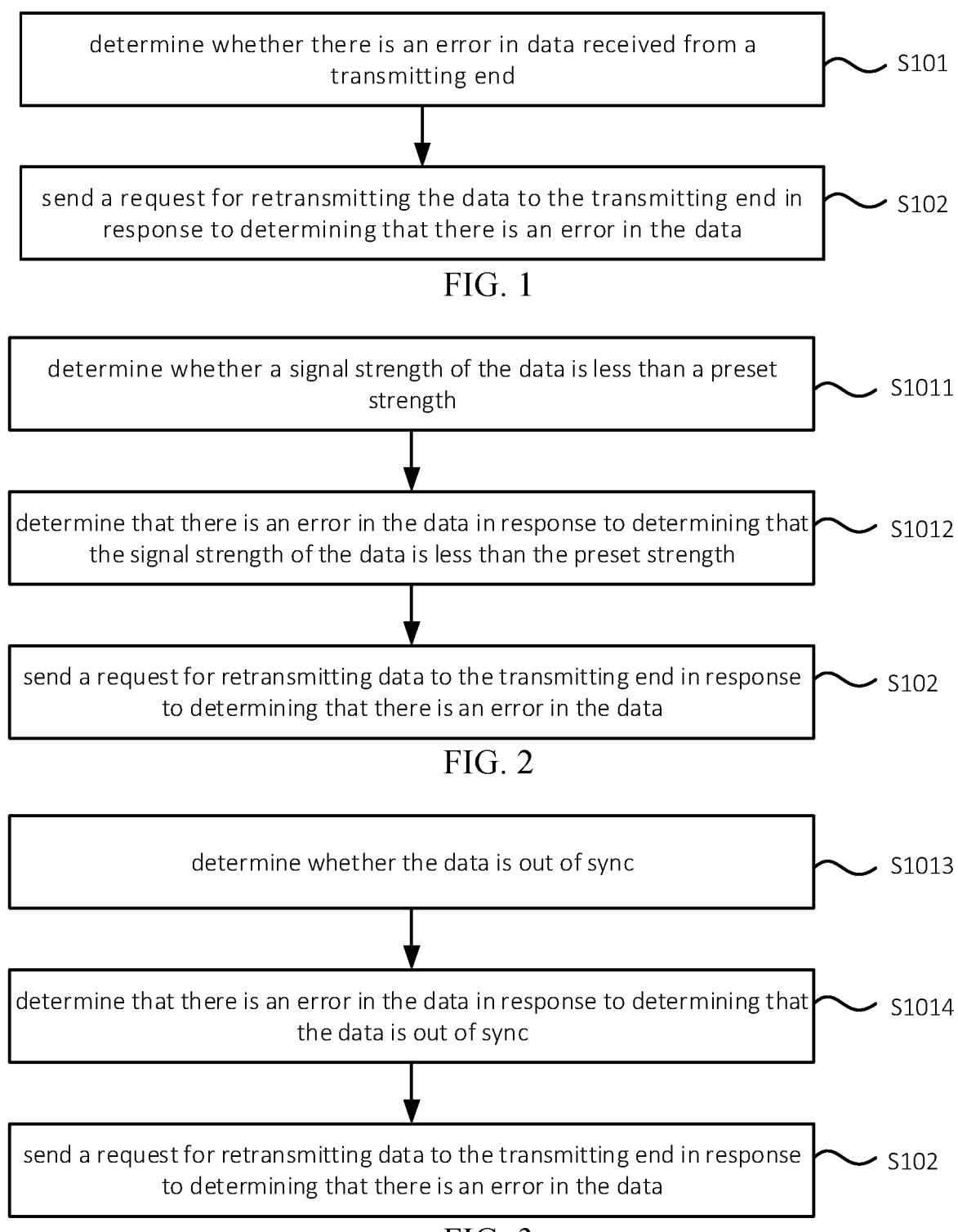

determine whether there is an error in data received from a transmitting end — S101 send a request for retransmitting the data to the transmitting end in response to determining that there is an error in the data — S102

FIG. 1 determine whether a signal strength of the data is less than a preset strength — S1011 determine that there is an error in the data in response to determining that the signal strength of the data is less than the preset strength — S1012 send a request for retransmitting data to the transmitting end in response to determining that there is an error in the data — S102

FIG. 2 determine whether the data is out of sync — S1013 determine that there is an error in the data in response to determining that the data is out of sync — S1014 send a request for retransmitting data to the transmitting end in response to determining that there is an error in the data — S102

FIG. 3

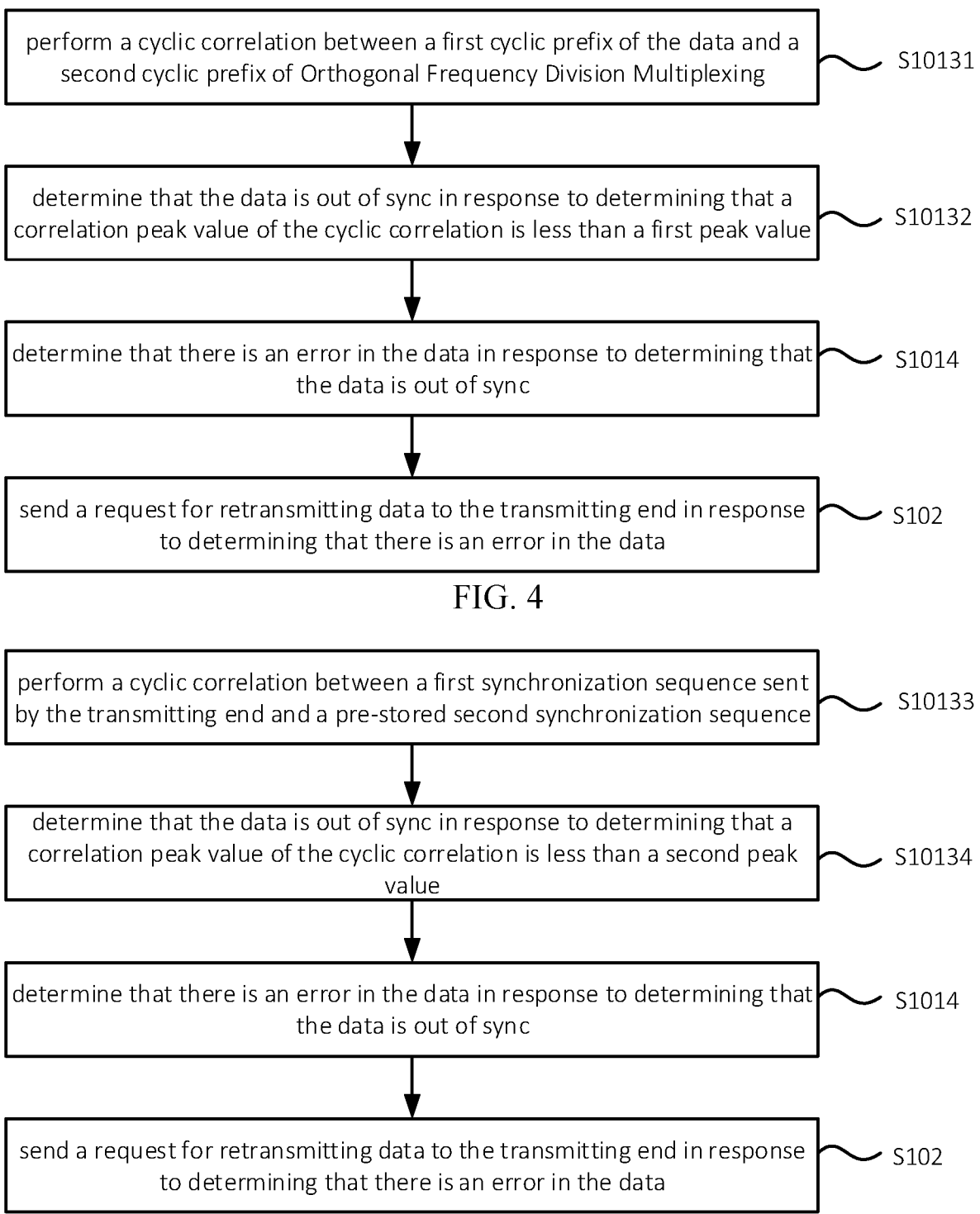

perform a cyclic correlation between a first cyclic prefix of the data and a second cyclic prefix of Orthogonal Frequency Division Multiplexing — S10131 determine that the data is out of sync in response to determining that a correlation peak value of the cyclic correlation is less than a first peak value — S10132 determine that there is an error in the data in response to determining that the data is out of sync — S1014 send a request for retransmitting data to the transmitting end in response to determining that there is an error in the data — S102

FIG. 4 perform a cyclic correlation between a first synchronization sequence sent by the transmitting end and a pre-stored second synchronization sequence — S10133 determine that the data is out of sync in response to determining that a correlation peak value of the cyclic correlation is less than a second peak value — S10134 determine that there is an error in the data in response to determining that the data is out of sync — S1014 send a request for retransmitting data to the transmitting end in response to determining that there is an error in the data — S102

FIG. 5

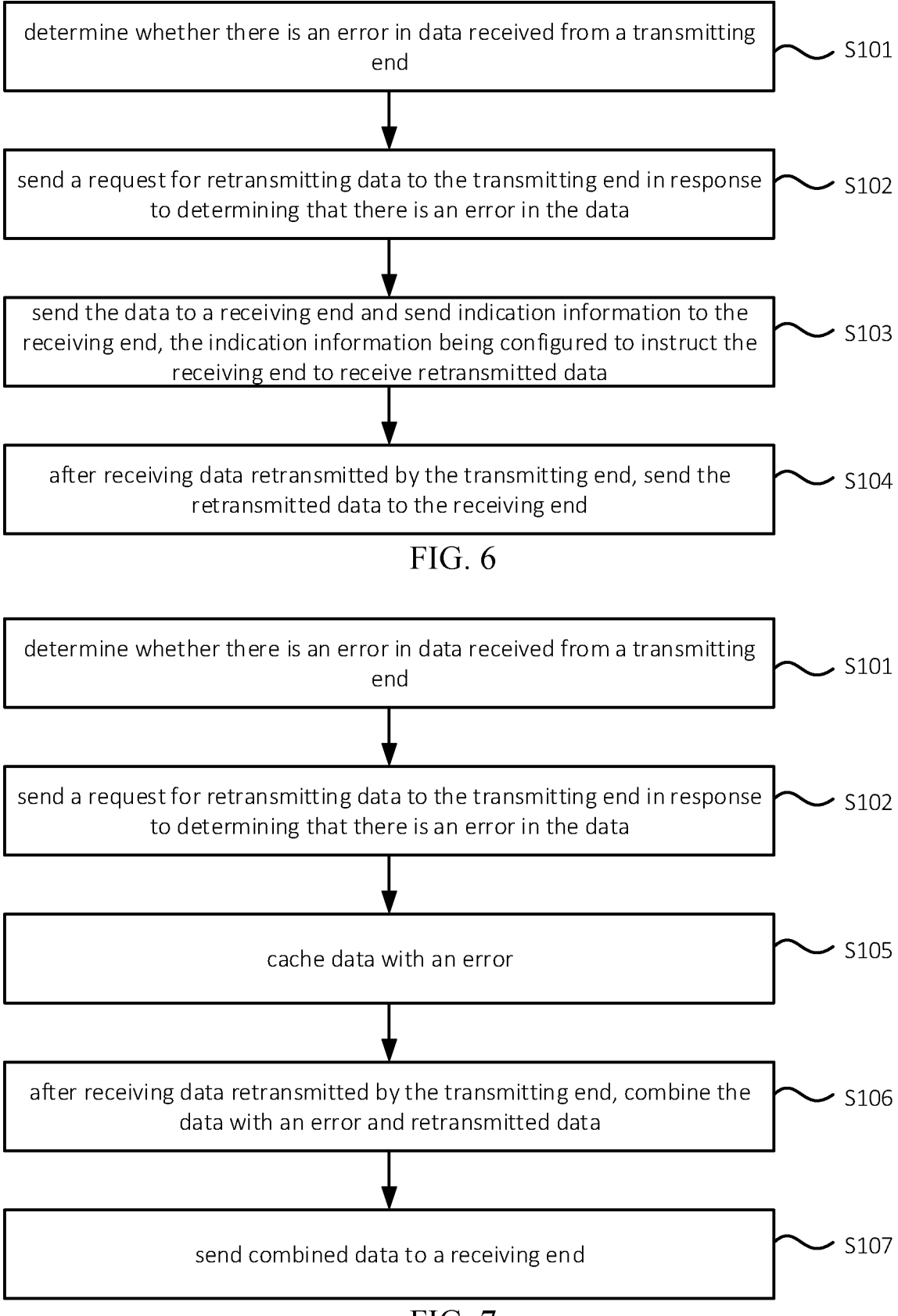

| determine whether there is an error in data received from a transmitting end | S101 |

| send a request for retransmitting data to the transmitting end in response to determining that there is an error in the data | S102 |

| send the data to a receiving end and send indication information to the receiving end, the indication information being configured to instruct the receiving end to receive retransmitted data | S103 |

| after receiving data retransmitted by the transmitting end, send the retransmitted data to the receiving end | S104 |

FIG. 6

| determine whether there is an error in data received from a transmitting end | S101 |

| send a request for retransmitting data to the transmitting end in response to determining that there is an error in the data | S102 |

| cache data with an error | S105 |

| after receiving data retransmitted by the transmitting end, combine the data with an error and retransmitted data | S106 |

| send combined data to a receiving end | S107 |

FIG. 7

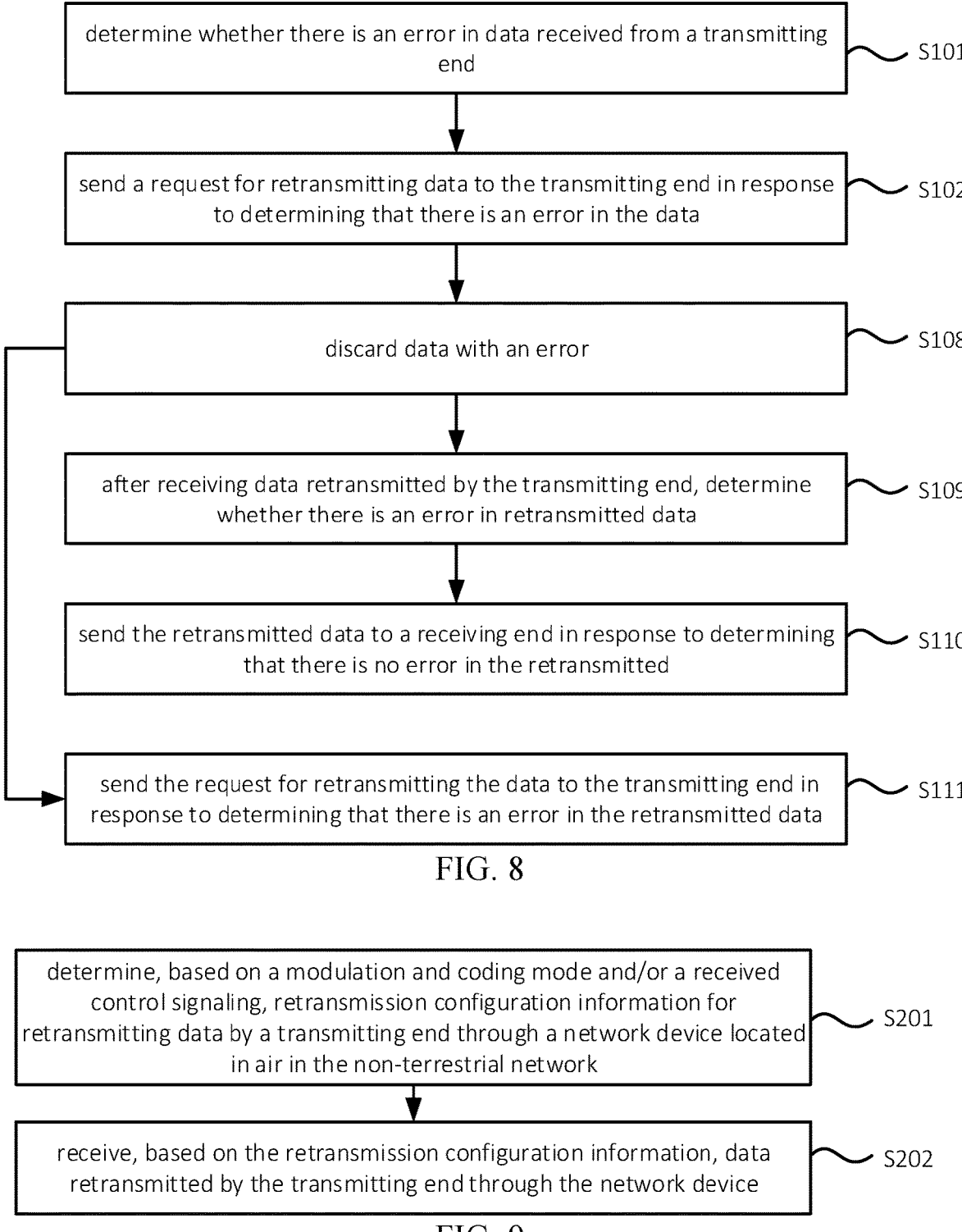

determine whether there is an error in data received from a transmitting end ~ S101 send a request for retransmitting data to the transmitting end in response to determining that there is an error in the data ~ S102 discard data with an error ~ S108 after receiving data retransmitted by the transmitting end, determine whether there is an error in retransmitted data ~ S109 send the retransmitted data to a receiving end in response to determining that there is no error in the retransmitted ~ S110 send the request for retransmitting the data to the transmitting end in response to determining that there is an error in the retransmitted data ~ S111

FIG. 8 determine, based on a modulation and coding mode and/or a received control signaling, retransmission configuration information for retransmitting data by a transmitting end through a network device located in air in the non-terrestrial network ~ S201 receive, based on the retransmission configuration information, data retransmitted by the transmitting end through the network device ~ S202

FIG. 9

RETRANSMISSION REQUEST METHOD AND APPARATUS, AND RETRANSMITTED DATA RECEPTION METHOD AND APPARATUS

CROSS-REFERENCE TO RELATED APPLICATION

This application is the U.S. national phase application of International Application No. PCT/CN2020/102498, filed on Jul. 16, 2020, the content of which is hereby incorporated by reference in its entirety for all purposes.

TECHNICAL FIELD

The disclosure relates to a field of wireless communication technologies, and more particularly, to a method for requesting retransmission, a method for receiving retransmitted data, an apparatus for requesting retransmission, an apparatus for receiving retransmitted data, an electronic device, and a computer-readable storage medium.

BACKGROUND

With the official commercial use of the 5G technologies, researches on 6G technologies have been put on the agenda. The 6G technologies need to satisfy the requirement that terminals at any location are able to communicate. However, because the base stations in existing networks are located on the ground and there are many restrictions on setting up the base stations, it is difficult to cover a large range of ground through the ground base stations. Therefore, the satellites are taken into consideration to cover the large range of ground.

To complete communication through the satellite, the base station needs to transmit the data to the satellite, and the satellite transmits the data to the terminal. However, the data transmitted to the terminal may have errors due to various reasons. When the terminal finds that the received data has an error, the terminal can send a retransmission request to the satellite and the satellite sends the retransmission request to the base station, such that the base station retransmits the data.

SUMMARY

According to a first aspect of the disclosure, a method for requesting retransmission is provided, which is performed by a network device located in the air in a non-terrestrial network. The method includes:

determining whether there is an error in data received from a transmitting end; and sending a request for retransmitting the data to the transmitting end, in response to determining that there is an error in the data.

According to a second aspect of the disclosure, a method for receiving retransmitted data is provided, which is performed by a receiving end in a non-terrestrial network. The method includes:

determining, based on a modulation and coding mode and/or a received control signaling, retransmission configuration information of retransmitting data by a transmitting end through a network device located in the air in a non-terrestrial network; and receiving, based on the retransmission configuration information, the data retransmitted by the transmitting end through the network device.

According to a third aspect of the disclosure, an electronic device is provided. The electronic device includes:

a processor;

a memory for storing processor-executable instructions;

in which the processor is configured to implement the method for requesting retransmission described in the first aspect, and/or the method for receiving retransmitted data described in the second aspect.

According to a fourth aspect of the disclosure, a computer-readable storage medium is provided, on which a computer program is stored. When the program is executed by a processor, steps of the method for requesting retransmission described in the first aspect, and/or the method for receiving retransmitted data described in the second aspects.

BRIEF DESCRIPTION OF THE DRAWINGS

In order to illustrate the technical solutions in the embodiments of the disclosure more clearly, the following briefly introduces the accompanying drawings used in the description of the embodiments. Obviously, the accompanying drawings in the following description are only some embodiments of the disclosure. For those of ordinary skill in the art, other drawings can also be obtained from these drawings without creative labor.

FIG. 1 is a schematic flowchart illustrating a method for requesting retransmission according to some embodiments of the disclosure.

FIG. 2 is a schematic flowchart illustrating another method for requesting retransmission according to some embodiments of the disclosure.

FIG. 3 is a schematic flowchart illustrating still another method for requesting retransmission according to some embodiments of the disclosure.

FIG. 4 is a schematic flowchart illustrating yet another method for requesting retransmission according to some embodiments of the disclosure.

FIG. 5 is a schematic flowchart illustrating yet another method for requesting retransmission according to some embodiments of the disclosure.

FIG. 6 is a schematic flowchart illustrating yet another method for requesting retransmission according to some embodiments of the disclosure.

FIG. 7 is a schematic flowchart illustrating yet another method for requesting retransmission according to some embodiments of the disclosure.

FIG. 8 is a schematic flowchart illustrating yet another method for requesting retransmission according to some embodiments of the disclosure.

FIG. 9 is a schematic flowchart illustrating a method for receiving retransmitted data according to some embodiments of the disclosure.

DETAILED DESCRIPTION

Figure 10:
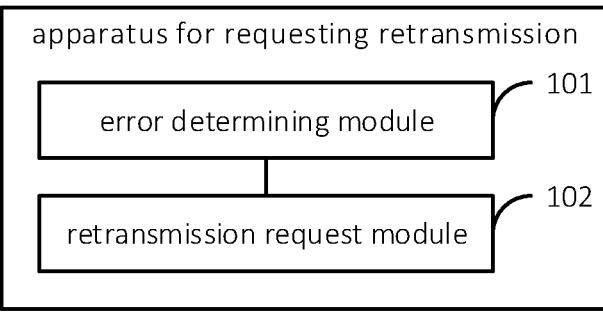
FIG. 10 is a block diagram illustrating an apparatus for requesting retransmission according to some embodiments of the disclosure.

The technical solutions according to embodiments of the disclosure will be clearly and completely described below with reference to the accompanying drawings in the embodiments of the disclosure. Obviously, the described embodiments are only a part of the embodiments of the disclosure, but not all of the embodiments. Based on the embodiments in the disclosure, all other embodiments obtained by those of ordinary skill in the art without creative efforts shall fall within the protection scope of the disclosure.

To complete communication through the satellite, the base station needs to transmit the data to the satellite, and the satellite transmits the data to the terminal. However, the data transmitted to the terminal may have errors due to various reasons. When the terminal finds that the received data has an error, the terminal can send a retransmission request to the satellite and the satellite sends the retransmission request to the base station, such that the base station retransmits the data.

Since the satellite is in the air and moves at a high speed, it will take a long time to send the retransmission request to the satellite and then to the base station from the satellite, which will result in a large delay for the retransmitted data to reach the terminal. Not only does it take a long time to send the retransmission request to the base station via the satellite, but also the time delay for sending the data from the base station to the terminal via the satellite is long. This easily causes that the data received by the terminal is out of sync and thus the terminal considers that the data has an error.

In view of this, embodiments of the disclosure provide a method for requesting retransmission, a method for receiving retransmitted data, an apparatus for requesting retransmission, an apparatus for receiving retransmitted data, an electronic device, and a computer-readable storage medium, to solve the technical problem existing the related art.

According to the embodiments of the disclosure, the network device can determine whether there is an error in the data sent by the transmitting end, and when there is an error in the data, the network device can send a request for retransmitting the data to the transmitting end of the data, to cause the transmitting end to retransmit the data. Accordingly, the receiving end of the data does not need to determine whether there is an error in the data or send the request for retransmitting the data to the transmitting end via the network device when there is an error in the data. Instead, the network device can directly send the request for retransmitting data to the transmitting end. When there is errors in the data, it can be ensured that the sending terminal receives the request for retransmitting the data as quickly as possible and send the retransmitted data to the receiving end as quickly as possible.

FIG. 1 is a schematic flowchart illustrating a method for requesting retransmission according to some embodiments of the disclosure. The method of these embodiments may be executed by a network device located in the air in a non-terrestrial network (NTN). The network device may be a satellite or an aerial platform, and the network device may transmit data from a ground base station to the terminal, or process data and transmits the processed data to the terminal. The terminal includes, but is not limited to, an electronic device, such as a mobile phone, a tablet computer, a wearable device, a sensor, or an Internet of Things device.

As illustrated in FIG. 1, the method for requesting retransmission may include the following.

In step S101, it is determined whether there is an error in data received from a transmitting end.

In step S102, a request for retransmitting the data (also called a data transmission request) is sent to the transmitting end, in response to determining that there is an error in the data.

In one embodiment, the network device can receive data sent by the transmitting end, and check the received data to determine whether there is an error in the received data. The error in the data includes, but is not limited to, the following two situations, one is that the signal strength of the received data is relatively low and the second is that the received data is out of sync, which will be described in the following embodiments.

In the case that there is an error in the data, the network device may send the data retransmission request to the transmitting end of the data, to cause the transmitting end to retransmit the data. Accordingly, there is no need for the receiving end of the data, such as a terminal, to determine whether there is an error in the data, and there is no need for the receiving end to send the data retransmission request to the transmitting end via the network device when there is an error in the data. Instead, the network device directly sends the data retransmission request to the transmitting end. Therefore, when there is an error in the data, it can ensure that the sending terminal receives the data retransmission request as quickly as possible and send the retransmitted data to the receiving end as quickly as possible.

It is noteworthy that the "receiving end" mentioned here and in subsequent embodiments may be a terminal, and the "transmitting end" may be a ground base station or a gateway station which may send data from the ground base station to the network device or may be a terminal, that is, signals can be sent between terminals through a network device.

FIG. 2 is a schematic flowchart illustrating another method for requesting retransmission according to some embodiment of the disclosure. As illustrated in FIG. 2, determining whether there is an error in the data received from the transmitting end includes the following.

In step S1011, it is determined whether a signal strength of the data is less than a preset strength.

In step S1012, it is determined that there is an error in the data, in response to determining that the signal strength of the data is less than the preset strength.

In one embodiment, the network device may detect the received data to determine the signal strength of the data. The signal strength can be characterized by Reference Signal Receiving Power (RSRP), Reference Signal Receiving Quality (RSRQ), and so on.

When the signal strength of the data is, for example, less than the preset strength, there is a high probability that an error occurs in the data. For example, when the verification fails (such as CRC verification fails) or the data cannot be demodulated, it can be determined that there is an error in the data. Thus, the request for retransmitting the data is sent to the transmitting end of the data.

FIG. 3 is a schematic flowchart illustrating still another method for requesting retransmission according to some embodiments of the disclosure. As illustrated in FIG. 3, determining whether there is an error in the data received from the transmitting end includes the following.

In step S1013, it is determined whether the data is out of sync.

In step S1014, it is determined that there is an error in the data, in response to determining that the data is out of sync.

In one embodiment, the network device can detect whether the data is out of sync, that is, detect whether the data is out of synchronization. If it is determined that the data is out of sync, it can be determined that there is an error in the data, so as to send the request for retransmitting the data to the transmitting end of the data.

FIG. 4 is a schematic flowchart illustrating yet another method for requesting retransmission according to some embodiments of the disclosure. As illustrated in FIG. 4, determining whether the data is out of sync includes the following.

In step S10131, a cyclic correlation is performed between a first cyclic prefix of the data and a second cyclic prefix of Orthogonal Frequency Division Multiplexing (OFDM).

In step S10132, it is determined that the data is out of sync, in response to determining that a correlation peak value of the cyclic correlation is smaller than a first peak value.

In one embodiment, for the data communicated between the transmitting end and the receiving end, the content at the end of the data is extracted and placed at the head of the data as the cyclic prefix (CP). The extracted content may be called the second cyclic prefix of OFDM. The network device may determine the cyclic prefix located at the head of the received data as the first cyclic prefix, and perform the cyclic correlation between the first cyclic prefix and the second cyclic prefix, to determine the correlation peak value of the cyclic correlation between the first cyclic prefix and the second cyclic prefix.

Generally, the content of the first cyclic prefix and the content of the second cyclic prefix are the same. However, due to problems such as delay in the transmission process, there may be an offset in the time domain between the first cyclic prefix and the second cyclic prefix. The more the offset is, the smaller the correlation peak value is, and greater the possibility of out-of-sync is. Therefore, when the correlation peak value is smaller than the first peak value (which may be stored in advance), it can be determined that the data is out of sync.

FIG. 5 is a schematic flowchart illustrating yet another method for requesting retransmission according to some embodiments of the disclosure. As illustrated in FIG. 5, determining whether the data is out of sync includes the following.

In step S10133, a cyclic correlation is performed between a first synchronization sequence sent by the transmitting end and a pre-stored second synchronization sequence.

In step S10134, it is determined that the data is out of sync, in response to determining that a correlation peak value of the cyclic correlation is smaller than a second peak value.

In one embodiment, while sending the data, the transmitting end may also send the first synchronization sequence, and the network device may store the second synchronization sequence in advance. The content of the first synchronization sequence and the content of the second synchronization sequence may be the same.

Further, the cyclic correlation can be performed on the first synchronization sequence and the second synchronization sequence. Since the content of the first cyclic prefix and the content of the second cyclic prefix are the same, but due to problems such as time delay in the transmission process, there may be an offset in the time domain between the first synchronization sequence and the second synchronization sequence. The more the offset is, the smaller the correlation peak value is and the higher the possibility that the data is out of synch is. Therefore, when the correlation peak value is smaller than the second peak value (which can be stored in advance), it can be determined that the data is out of sync.

FIG. 6 is a schematic flowchart illustrating yet another method for requesting retransmission according to some embodiments of the disclosure. As illustrated in FIG. 6, the method further includes the following.

In step S103, the data is sent to the receiving end, and indication information is sent to the receiving end. The indication information is configured to instruct the receiving end to receive retransmitted data.

In step S104, after receiving the data retransmitted by the transmitting end, the retransmitted data is sent to the receiving end.

In one embodiment, after sending the data retransmission request to the transmitting end, the network device may send the data that it has been determined there is an error (also called data with an error) to the terminal and send the indication information to the terminal to instruct the receiving end to receive the data. In addition, after receiving the data retransmitted by the transmitting end, the network device can also send the retransmitted data to the receiving end, and the receiving end can combine the data that it has been determined there is an error and the retransmitted data, so as to obtain data without errors.

It is noteworthy that the "combining" mentioned here and in subsequent embodiments may be symbol-level combining or bit-level combining. The symbol-level combining is to directly combine the received OFDM symbols, which plays the role of energy combining. The bit-level combining can be, for example, Incremental Redundancy (IR) combining, Chase Combine (CC), and the like.

FIG. 7 is a schematic flowchart illustrating yet another method for requesting retransmission according to some embodiments of the disclosure. As illustrated in FIG. 7, the method further includes the following.

In step S105, the data with an error is cached.

In step S106, after receiving the data retransmitted by the transmitting end, the data with an error is combined with the retransmitted data.

In step S107, the combined data is sent to the receiving end.

In one embodiment, after sending the data retransmission request to the transmitting end, the network device may cache the data that it has been determined there is an error. After receiving the data retransmitted by the transmitting end, the network device may combine the retransmitted data with the data that it has been determined there is an error to obtain data without error, and send the combined data to the terminal.

It is noteworthy that the combining operation in the embodiments of FIG. 6 can be completed by the receiving end, thereby saving the resources of the network device. The combining operation in the embodiments of FIG. 7 can be completed by the network device, thereby saving the resources of the receiving end. It can be selected as required whether to perform the combining operation according to the embodiments of FIG. 6 or according to the embodiments of FIG. 7.

FIG. 8 is a schematic flowchart illustrating yet another method for requesting retransmission according to some embodiments of the disclosure. As illustrated in FIG. 8, the method further includes the following.

In step S108, the data with an error is discarded.

In step S109, after receiving the data retransmitted by the transmitting end, it is determined whether there is an error in the retransmitted data.

In step S110, the retransmitted data is sent to the receiving end, in response to determining that there is no error in the retransmitted data.

In step S111, the data retransmission request is sent to the transmitting end, in response to determining that there is an error in the retransmitted data.

In one embodiment, the network device may discard, for example delete, the data that it has been determined there is an error. After receiving the data retransmitted by the transmitting end, the network device determines whether the retransmitted data has an error. If the retransmitted data does not have any error, the network device sends the retransmitted data to the receiving end. If the retransmitted data still has an error, the data retransmission request can be sent to the transmitting end again.

It is noteworthy that, the above steps S109 and S111 may be performed in a loop for many times until it is determined that the retransmitted data does not have an error, or until the number of loop executions reaches a preset number of times.

In one embodiment, the manner of retransmitting data by the transmitting end to the network device may include retransmitting the data to the network device every time the transmitting end receives the data retransmission request, or retransmitting data multiple times to the network device after receiving the data retransmission request, where the number of retransmissions of the data can be determined by the network device according to a modulation and coding mode of the data or according to a control signaling sent by the transmitting end.

FIG. 9 is a schematic flowchart illustrating a method for receiving retransmitted data according to some embodiments of the disclosure. The method may be executed by a receiving end in a non-terrestrial network. The receiving end may be a terminal. The terminal includes, but is not limited to, an electronic device such as a mobile phone, a tablet computer, a wearable device, a sensor, and an Internet of Things device. The receiving end can communicate with the transmitting end in the non-terrestrial network through a network device located in the air in the non-terrestrial network. The network device can be a satellite or an air platform, and the transmitting end can be a ground base station or a gateway station. The gateway station can send data from the ground base station to the network device.

As illustrated in FIG. 9, the method for receiving retransmitted data may include the following.

In step S201, retransmission configuration information for retransmitting data by a network device located in air in a non-terrestrial network is determined based on a modulation and coding mode and/or a received control signaling.

In step S202, data retransmitted by a transmitting end through the network device is received based on the retransmission configuration information.

In an embodiment, the transmitting end may retransmit data to the receiving end according to the retransmission configuration information. For example, the retransmission configuration information includes at least one of the number of retransmissions or the retransmission period. That is, regardless of whether the receiving end determines that the received data has an error, the transmitting end can retransmit the data to the transmitting end according to the retransmission configuration information without receiving the data retransmission request. The receiving end can combine pieces of data that are retransmitted multiple times to obtain data without error. Since the transmitting end can retransmit the data without waiting for the data retransmission request, it can be ensured that the transmitting terminal receives the request for retransmitting the data as quickly as possible.

The receiving end can determine the retransmission configuration information according to the modulation and coding scheme, which can be understood as determining the retransmission configuration information according to the Modulation and Coding Scheme (MCS). That is, each modulation and coding mode (for example, an index in the modulation and coding scheme) pre-stored in the receiving end has an association relationship with each retransmission configuration information. Therefore, the retransmission configuration information is determined based on the modulation and coding mode currently used for communication with the receiving end and the association relationship.

The transmitting end may also indicate the retransmission configuration information to the receiving end through the control signaling, such that the transmitting end may determine the retransmission configuration information based on the control signaling.

Corresponding to the foregoing embodiments of the method for requesting retransmission and the method for receiving retransmitted data, the disclosure also provides embodiments of an apparatus for requesting retransmission and an apparatus for receiving retransmitted data.

FIG. 10 is a block diagram illustrating an apparatus for requesting retransmission according to some embodiments of the disclosure. The apparatus illustrated in this embodiment may be applicable to a network located in the air in a non-terrestrial network. The network device may be a satellite or an aerial platform. The network device may transparently transmit data from a ground base station to a terminal, or may process the data and then transmit the processed data to the terminal. The terminal includes, but is not limited to, an electronic device such as a mobile phone, a tablet computer, a wearable device, a sensor, and an Internet of Things device.

As illustrated in FIG. 10, the apparatus for requesting retransmission may include the following.

An error determining module 101 is configured to determine whether there is an error in data received from a transmitting end.

A retransmission request module 102 is configured to, send a request for retransmitting the data to the transmitting end, in response to determining that there is an error in the data.

In some examples, the error determining module is configured to determine whether a signal strength of the data is less than a preset strength; and determine that there is an error in the data in response to determining that the signal strength of the data is less than the preset strength.

In some examples, the error determining module is configured to determine whether the data is out of sync; and determine that there is an error in the data in response to determining that the data is out of sync.

In some examples, the error determining module is configured to perform a cyclic correlation between a first cyclic prefix of the data and a second cyclic prefix of Orthogonal Frequency Division Multiplexing; and determine that the data is out of sync in response to determining that a correlation peak value of the cyclic correlation is smaller than a first peak value.

In some examples, the error determining module is configured to perform a cyclic correlation between a first synchronization sequence sent by the transmitting end and a pre-stored second synchronization sequence; and determine that the data is out of sync in response to determining that a correlation peak value of the cyclic correlation is less than the second peak value.

Figure 11:
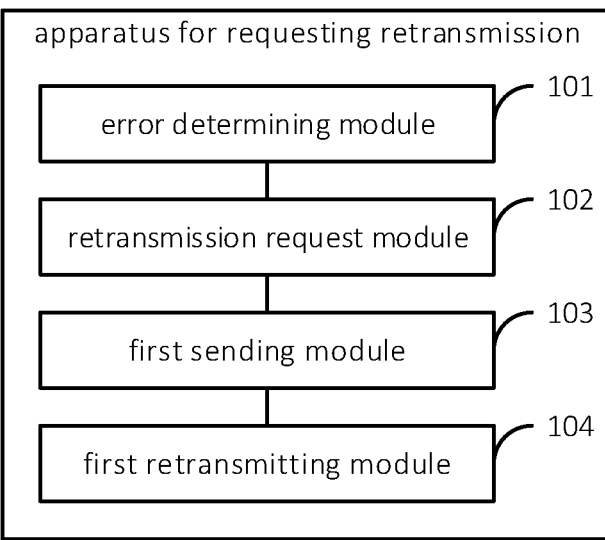
FIG. 11 is a block diagram illustrating still another apparatus for requesting retransmission according to some embodiments of the disclosure.

FIG. 11 is a block diagram illustrating another apparatus for requesting retransmission according to some embodiments of the disclosure. As illustrated in FIG. 11, the device further includes the following.

A first sending module 103 is configured to send the data to a receiving end, and send indication information to the receiving end. The indication information is configured to instruct the receiving end to receive retransmitted data.

A first retransmitting module 104 is configured to send the retransmitted data to the receiving end after receiving retransmitted data from the transmitting end.

Figure 12:
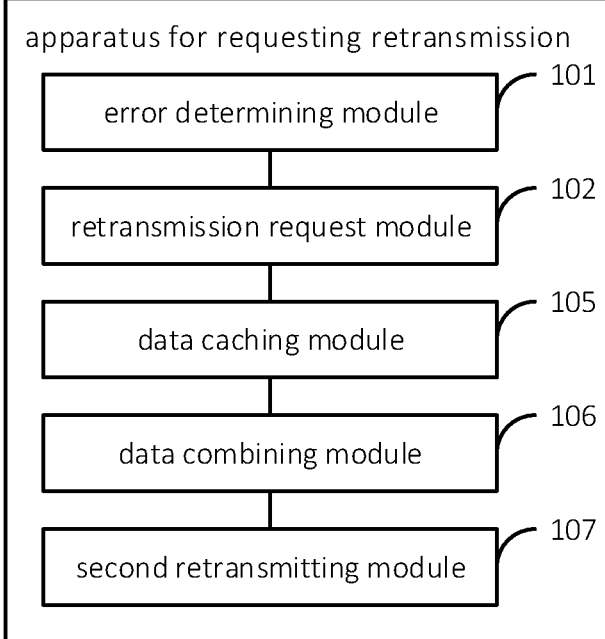
FIG. 12 is a block diagram illustrating yet another apparatus for requesting retransmission according to some embodiments of the disclosure.

FIG. 12 is a block diagram illustrating yet another apparatus for requesting retransmission according to some embodiments of the disclosure. As illustrated in FIG. 12, the device further includes the following.

A data caching module 105 is configured to cache the data with an error.

A data combining module 106 is configured to combine the data with an error and the retransmitted data after receiving the retransmitted data from the transmitting end.

A second retransmitting module 107 is configured to send the combined data to the receiving end.

Figure 13:
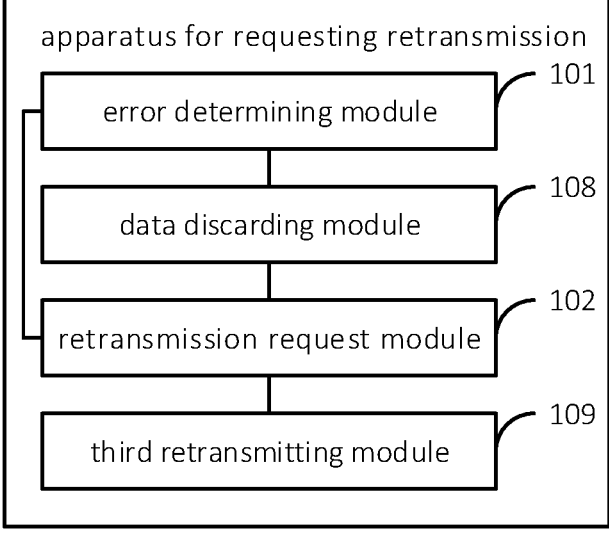
FIG. 13 is a block diagram illustrating yet another apparatus for requesting retransmission according to some embodiments of the disclosure.

FIG. 13 is a block diagram of yet another apparatus for requesting retransmission according to some embodiments of the disclosure. As illustrated in FIG. 13, the device further includes the following.

A data discarding module 108, configured to discard data with an error.

The error determining module 101 is further configured to determine whether there is an error in the retransmitted data after receiving the retransmitted data from the transmitting end.

A third retransmitting module 109 is configured to send the retransmitted data to the receiving end in response to determining that there is no error in the retransmitted data.

The retransmission request module 102 is configured to send the request for retransmitting data to the transmitting end in response to determining that there is an error in the retransmitted data.

Figure 14:
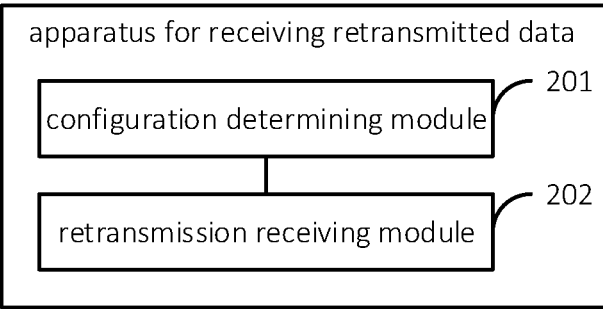
FIG. 14 is a block diagram illustrating an apparatus for receiving retransmitted data according to some embodiments of the disclosure.

FIG. 14 is a block diagram illustrating an apparatus for receiving retransmitted data according to some embodiments of the disclosure. The apparatus illustrated in this embodiment may be applicable to a receiving end in a non-terrestrial network. The receiving end may be a terminal. The terminal includes, but is not limited to, an electronic device such as a mobile phone, a tablet computer, a wearable device, a sensor, and an Internet of Things device. The receiving end can communicate with a transmitting end in the non-terrestrial network through a network device located in the air in the non-terrestrial network. The network device can be a satellite or an air platform. The transmitting end can be a ground base station or a gateway station. The gateway station can send data from the ground base station to the network device.

As illustrated in FIG. 14, the apparatus for receiving retransmitted data may include the following.

a configuration determining module 201 is configured to determine retransmission configuration information for retransmitting data by a transmitting end through a network device located in the air in the non-terrestrial network based on a modulation and coding mode and/or a received control signaling;

A retransmission receiving module 202 is configured to receive, based on the retransmission configuration information, data retransmitted by the transmitting end through the network device.

In some examples, the retransmission configuration information includes at least one of the number of retransmissions or a retransmission period.

Regarding the apparatuses in the foregoing embodiments, the specific manners in which each module performs operations have been described in detail in the embodiments of the related methods, and will not be described in detail here.

For the apparatus embodiments, since they basically correspond to the method embodiments, reference may be made to the partial descriptions of the method embodiments for related parts. The apparatus embodiments described above are only illustrative, in which the modules described as separate components may or may not be physically separated, and the components displayed as modules may or may not be physical modules, that is, they may be located in one place, or distributed over multiple network modules. Some or all of the modules may be selected according to actual needs to achieve the purpose of the solution in this embodiment. Those of ordinary skill in the art can understand and implement it without creative effort.

Embodiments of the disclosure also provide an electronic device. The electronic device includes a processor and a memory for storing processor-executable instructions. The processor is configured to implement the method for requesting retransmission described in any of the foregoing embodiments, and/or the method for receiving retransmitted data described in any of the foregoing embodiments.

Embodiments of the disclosure further provide a computer-readable storage medium, on which a computer program is stored. When the program is executed by a processor, steps of the method for requesting retransmission described in any of the foregoing embodiments, and/or steps of the method for receiving retransmitted data in any of the foregoing embodiments are executed.

Figure 15:
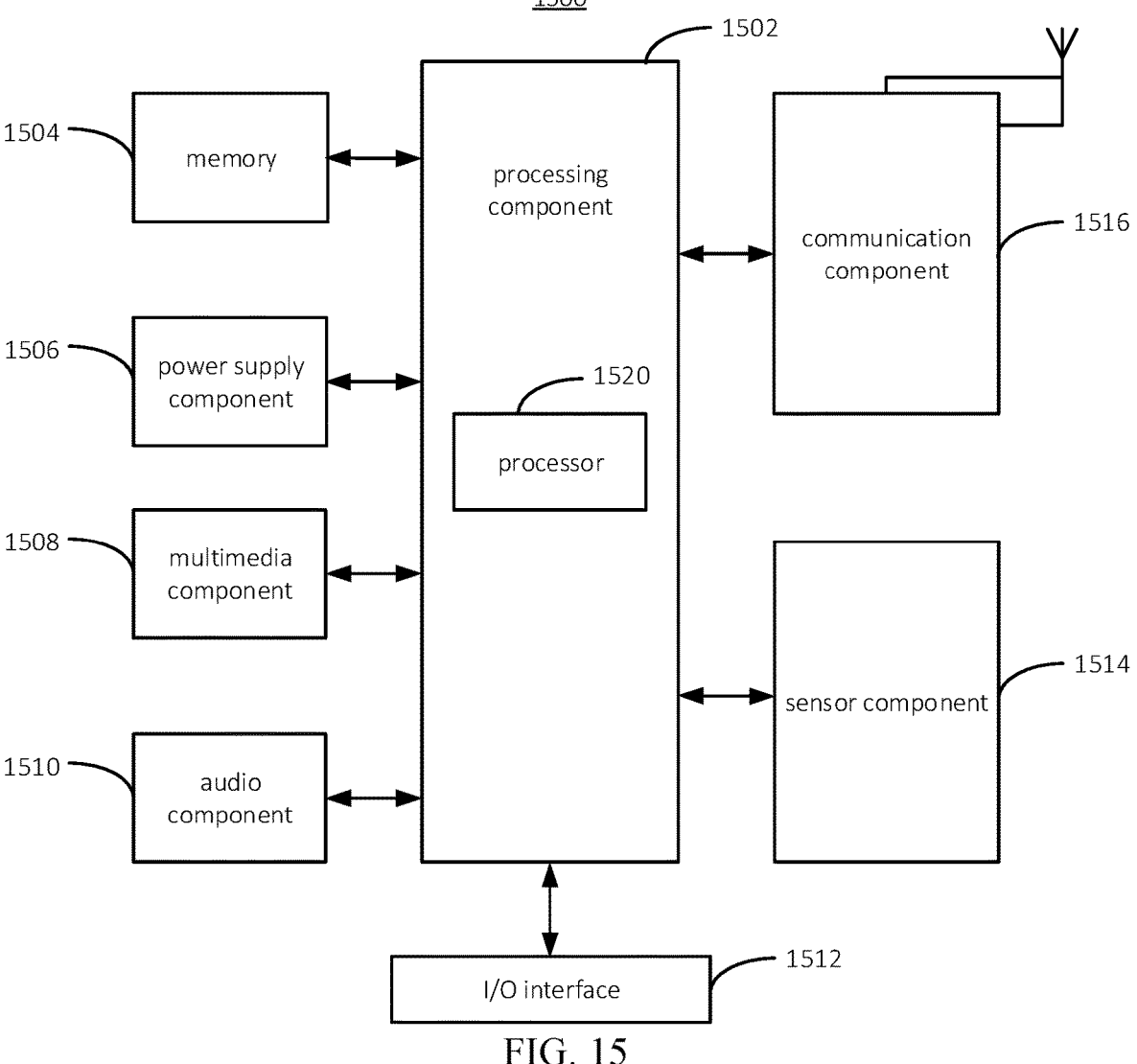
FIG. 15 is a block diagram illustrating an apparatus for receiving retransmission data according to some embodiments of the disclosure.

FIG. 15 is a block diagram illustrating a device 1500 for receiving retransmitted data according to some embodiments of the disclosure. For example, the device 1500 may be a mobile phone, a computer, a digital broadcast terminal, a messaging device, a game console, a tablet device, a medical device, a fitness device, a personal digital assistant, or the like.

As illustrated in FIG. 15, the device 1500 may include one or more of the following components: a processing component 1502, a memory 1504, a power supply component 1506, a multimedia component 1508, an audio component 1510, an input/output (I/O) interface 1512, a sensor component 1514, and a communication component 1516.

The processing component 1502 generally controls the overall operation of the device 1500, such as operations associated with display, phone calls, data communications, camera operations, and recording operations. The processing component 1502 can include one or more processors 1520 to execute instructions to perform all or some of the steps of the methods for receiving retransmitted data described above. Additionally, processing component 1502 may include one or more modules that facilitate interaction between processing component 1502 and other components. For example, processing component 1502 may include a multimedia module to facilitate interaction between multimedia component 1508 and processing component 1502.

The memory 1504 is configured to store various types of data to support operations of the device 1500. Examples of such data include instructions for any application or method operating on the device 1500, contact data, phonebook data, messages, pictures, videos, and the like. Memory 1504 may be implemented by any type of volatile or non-volatile storage device or combination thereof, such as static random access memory (SRAM), electrically erasable programmable read only memory (EEPROM), erasable Programmable Read Only Memory (EPROM), Programmable Read Only Memory (PROM), Read Only Memory (ROM), Magnetic Memory, Flash Memory, Magnetic Disk or Optical Disk.

The power supply component 1506 provides power to various components of the device 1500. The power supply component 1506 may include a power management system, one or more power supplies, and other components associated with generating, managing, and distributing power to the device 1500.

The multimedia component 1508 includes a screen that provides an output interface between the device 1500 and the user. In some embodiments, the screen may include a liquid crystal display (LCD) and a touch panel (TP). If the screen includes a touch panel, the screen may be implemented as a touch screen to receive input signals from a user. The touch panel includes one or more touch sensors to sense touch, swipe, and gestures on the touch panel. The touch sensors can sense not only the boundaries of a touch or swipe action, but also the duration and pressure associated with the touch or swipe action. In some embodiments, the multimedia component 1508 includes a front-facing camera and/or a rear-facing camera. When the device 1500 is in an operation mode, such as a shooting mode or a video mode, the front-facing camera and/or the rear-facing camera may receive external multimedia data. Each of the front-facing and rear-facing cameras can be a fixed optical lens system or have focal length and optical zoom capability.

The audio component 1510 is configured to output and/or input audio signals. For example, audio component 1510 includes a microphone (MIC) that is configured to receive external audio signals when the device 1500 is in operating modes, such as call mode, recording mode, and voice recognition mode. The received audio signal may be further stored in the memory 1504 or transmitted via the communication component 1516. In some embodiments, the audio component 1510 also includes a speaker for outputting audio signals.

The I/O interface 1512 provides an interface between the processing component 1502 and a peripheral interface module, which may be a keyboard, a click wheel, a button, and the like. These buttons may include, but are not limited to: home button, volume buttons, start button, and lock button.

The sensor component 1514 includes one or more sensors for providing status assessment of various aspects of the device 1500. For example, the sensor component 1514 can detect the on/off state of the device 1500, the relative positioning of components, such as the display and keypad of the device 1500, the sensor component 1514 can also detect a change in the position of the device 1500 or a component of the device 1500, the presence or absence of contact with the device 1500, the orientation or acceleration/deceleration of the device 1500 and the temperature change of the device 1500. The sensor component 1514 may include a proximity sensor configured to detect the presence of nearby objects in the absence of any physical contact. The sensor component 1514 may also include a light sensor, such as a CMOS or CCD image sensor, for use in imaging applications. In some embodiments, the sensor component

1514 may also include an acceleration sensor, a gyroscope sensor, a magnetic sensor, a pressure sensor, or a temperature sensor.

The communication component 1516 is configured to facilitate wired or wireless communication between the device 1500 and other devices. The device 1500 may access a wireless network based on a communication standard, such as Wi-Fi, 2G or 3G, 4G LTE, 5G NR or a combination thereof. In one embodiment, the communication component 1516 receives broadcast signals or broadcast related information from an external broadcast management system via a broadcast channel. In an embodiment, the communication component 1516 also includes a near field communication (NFC) module to facilitate short-range communication. For example, the NFC module can be implemented based on radio frequency identification (RFID) technology, infrared data association (IrDA) technology, ultra-wideband (UWB) technology, Bluetooth (BT) technology and other technologies.

In an embodiment, the device 1500 may be implemented by one or more application specific integrated circuits (ASICs), digital signal processors (DSPs), digital signal processing devices (DSPDs), programmable logic devices (PLDs), field programmable A gate array (FPGA), controller, microcontroller, microprocessor or other electronic component implementation for performing the above method for receiving retransmitted data.

According to embodiments of the disclosure, there is also provided a non-transitory computer-readable storage medium including instructions, such as a memory 1504 including instructions, which are executable by the processor 1520 of the device 1500 to perform the above method. For example, the non-transitory computer-readable storage medium may be ROM, random access memory (RAM), CD-ROM, magnetic tape, floppy disk, optical data storage device, and the like.

Other implementations of the embodiments of the disclosure will readily suggest themselves to those skilled in the art upon consideration of the specification and practice of the disclosure disclosed herein. This application is intended to cover any variations, uses, or adaptations of the embodiments of the disclosure that follow the general principles of the embodiments of the disclosure and include those common knowledge or conventional technical means in the technical field but not disclosed by the embodiments of the disclosure. The specification and examples are to be regarded as examples only, with the true scope and spirit of embodiments of the disclosure being indicated by the following claims.

It is understandable that the embodiments of the disclosure are not limited to the precise structures described above and illustrated in the accompanying drawings and that various modifications and changes may be made without departing from the scope thereof. The scope of embodiments of the disclosure is limited only by the appended claims.

It is noteworthy that, in the disclosure, relational terms such as first and second are used only to distinguish one entity or operation from another entity or operation, and do not necessarily require or imply any such actual relationship or order between these entities or operations. The terms "comprising", "including" or any other variation thereof are intended to encompass non-exclusive inclusion such that a process, method, article or device including a list of elements includes not only those elements, but also other not expressly listed elements, or also include elements inherent to such a process, method, article or apparatus. Without further limitation, an element qualified by the phrase "comprising a . . . " does not preclude the presence of additional identical elements in a process, method, article or apparatus that includes the element.

The methods and apparatus according to embodiments of the disclosure have been described in detail above, and specific examples are used to illustrate the principles and implementations of the disclosure. The descriptions of the embodiments are only used for understanding the method and core idea of the disclosure. At the same time, for those of ordinary skill in the art, according to the idea of the disclosure, there will be changes in the specific implementation and application scope. In summary, the contents of this specification should not be construed as limiting the disclosure.

What is claimed is:

1. A method for requesting retransmission, comprising:
determining, by a network device located in air in a non-terrestrial network, whether there is an error in data received from a transmitting end;
determining there is an error in the data; and
sending a request for retransmitting the data to the transmitting end,
wherein determining whether there is an error in the data received from the transmitting end comprises:
determining whether the data is out of sync; and
determining there is an error in the data in response to determining the data is out of sync;
wherein determining whether the data is out of sync comprises:
performing a cyclic correlation between a first cyclic prefix of the data and a second cyclic prefix of Orthogonal Frequency Division Multiplexing; and determining the data is out of sync in response to determining a correlation peak value of the cyclic correlation is less than a first peak value; or
performing a cyclic correlation between a first synchronization sequence sent by the transmitting end and a pre-stored second synchronization sequence; and determining the data is out of sync in response to determining a correlation peak value of the cyclic correlation is less than a second peak value.

2. The method of claim 1, further comprising:
sending, by the network device, the data to a receiving end and sending indication information to the receiving end, wherein the indication information is configured to instruct the receiving end to receive retransmitted data; and
sending, by the network device, the retransmitted data to the receiving end, after receiving data retransmitted by the transmitting end.

3. The method of claim 1, further comprising:
caching, by the network device, the data;
combining, by the network device, the data and retransmitted data to obtain combined data, after receiving data retransmitted by the transmitting end; and
sending, by the network device, the combined data to a receiving end.

4. The method of claim 1, further comprising:
discarding, by the network device, the data;
determining, by the network device, whether there is an error in retransmitted data, after receiving data retransmitted by the transmitting end;
sending, by the network device, the retransmitted data to a receiving end in response to determining there is no error in the retransmitted data; and sending the request for retransmitting the data to the transmitting end in response to determining there is an error in the retransmitted data.

5. A method for receiving retransmitted data, comprising:
determining, by a receiving end in a non-terrestrial network and based on at least one of a modulation and coding mode or a received control signaling, retransmission configuration information for retransmitting data by a transmitting end through a network device located in air in the non-terrestrial network,
wherein before the retransmission configuration information for retransmitting data is sent by the transmitting end, the network device determines whether data transmitted from the transmitting end is out of sync and determines there is an error in the data in response to determining the data is out of sync, and the network device sends a request for retransmitting the data to the transmitting end in response to determining there is an error in the data;
receiving, by the receiving end, based on the retransmission configuration information, data retransmitted by the transmitting end through the network device; and
determining there is an error in the data in response to determining the data is out of sync;
wherein the network device determines whether the data is out of sync by:
performing a cyclic correlation between a first cyclic prefix of the data and a second cyclic prefix of Orthogonal Frequency Division Multiplexing; and determining the data is out of sync in response to determining a correlation peak value of the cyclic correlation is less than a first peak value; or
performing a cyclic correlation between a first synchronization sequence sent by the transmitting end and a pre-stored second synchronization sequence; and determining the data is out of sync in response to determining a correlation peak value of the cyclic correlation is less than a second peak value.

6. The method of claim 5, wherein the retransmission configuration information comprises at least one of a number of retransmissions or a retransmission period.

7. A network device located in air in a non-terrestrial network, comprising:
a processor; and
a memory for storing processor-executable instructions;
wherein, the processor is configured to:
determine whether there is an error in data received from a transmitting end;
determine there is an error in the data; and
send a request for retransmitting the data to the transmitting end,
wherein the processor is further configured to:
determine whether the data is out of sync; and
determine there is an error in the data in response to determining the data is out of sync;
wherein the processor is further configured to:
perform a cyclic correlation between a first cyclic prefix of the data and a second cyclic prefix of Orthogonal Frequency Division Multiplexing; and determine the data is out of sync in response to determining a correlation peak value of the cyclic correlation is less than a first peak value; or
perform a cyclic correlation between a first synchronization sequence sent by the transmitting end and a pre-stored second synchronization sequence; and determine the data is out of sync in response to determining a correlation peak value of the cyclic correlation is less than a second peak value.

8. A non-transitory computer-readable storage medium, having a computer program stored thereon, wherein when the program is executed by a processor of a network device located in air in a non-terrestrial network, a method for requesting retransmission of claim 1 is executed.

9. The network device of claim 7, wherein the processor is further configured to:

send the data to a receiving end and sending indication information to the receiving end, wherein the indication information is configured to instruct the receiving end to receive retransmitted data; and send the retransmitted data to the receiving end, after receiving data retransmitted by the transmitting end.

10. The network device of claim 7, wherein the processor is further configured to:

cache the data;

combine the data and retransmitted data to obtain combined data, after receiving data retransmitted by the transmitting end; and send the combined data to a receiving end.

11. A receiving end in a non-terrestrial network, comprising:

a processor; and a memory for storing processor-executable instructions;

wherein, the processor is configured to execute a method for receiving retransmitted data of claim 5.

12. A non-transitory computer-readable storage medium, having a computer program stored thereon, wherein when the program is executed by a processor of a receiving end in a non-terrestrial network, a method for receiving retransmitted data of claim 5 is executed.

\* \* \* \* \*